(12) United States Patent
Yao et al.

(10) Patent No.: US 8,187,192 B2
(45) Date of Patent: May 29, 2012

(54) METHOD AND APPARATUS FOR SCAN CONVERSION AND INTERPOLATION OF ULTRASONIC LINEAR ARRAY STEERING IMAGING

(75) Inventors: Bin Yao, Shenzhen (CN); Yong Jiang, Shenzhen (CN); Yong Huang, Shenzhen (CN); Qinjun Hu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 816 days.

(21) Appl. No.: 12/271,740

(22) Filed: Nov. 14, 2008

(65) Prior Publication Data

US 2009/0143680 A1   Jun. 4, 2009

(30) Foreign Application Priority Data

Nov. 29, 2007   (CN) .......................... 2007 1 0197056

(51) Int. Cl.
*A61B 8/00* (2006.01)
(52) U.S. Cl. ....................................... 600/447; 600/443
(58) Field of Classification Search ................ 367/7, 74; 342/185; 382/300; 600/447, 437, 443
See application file for complete search history.

(56) References Cited

U.S. PATENT DOCUMENTS

| 4,214,269 | A | * | 7/1980 | Parker et al. ................... 348/442 |
| 4,236,221 | A | * | 11/1980 | Cribbs et al. ................... 348/163 |
| 4,310,907 | A | * | 1/1982 | Tachita et al. ................... 367/11 |
| 5,339,282 | A | * | 8/1994 | Kuhn et al. ........................ 367/7 |
| 5,531,224 | A | | 7/1996 | Ellis et al. |
| 6,368,279 | B1 | | 4/2002 | Liu |
| 7,537,567 | B2 | * | 5/2009 | Jago et al. ...................... 600/447 |
| 2004/0054281 | A1 | | 3/2004 | Adam et al. |
| 2006/0052696 | A1 | * | 3/2006 | Shiina et al. ................... 600/437 |

FOREIGN PATENT DOCUMENTS

| CN | 1593347 A | 3/2005 |
| CN | 1891159 A | 1/2007 |
| CN | 1923144 A | 3/2007 |

* cited by examiner

*Primary Examiner* — Brian Casler
*Assistant Examiner* — Shahdeep Mohammed
(74) *Attorney, Agent, or Firm* — Kory D. Christensen; Stoel Rives LLP

(57) ABSTRACT

A method and apparatus for scan conversion and interpolation of linear array steering imaging in an ultrasonic system are disclosed. The method computes the points that are most related to the point to be interpolated in the principal direction of the point spread function and performs interpolation in the principal direction of the point spread function according to the steering angle of the scan lines so as to obtain a more accurate interpolation result.

15 Claims, 4 Drawing Sheets

METHOD AND APPARATUS FOR SCAN CONVERSION AND INTERPOLATION OF ULTRASONIC LINEAR ARRAY STEERING IMAGING

CROSS-REFERENCE TO RELATED APPLICATIONS

This application claims priority to Chinese Patent Application No. 200710197056.0, filed on Nov. 29, 2007, for "Method and Apparatus for Scan Conversion and Interpolation of Ultrasonic Linear Array Steering Imaging," the disclosure of which is fully incorporated herein by reference.

TECHNICAL FIELD

This disclosure relates to scan conversion and interpolation of ultrasonic imaging.

BRIEF SUMMARY

A method and apparatus for scan conversion and interpolation of linear array steering imaging in an ultrasonic imaging system are disclosed.

DETAILED DESCRIPTION

Medical ultrasonic imaging devices use the propagation of ultrasonic waves in a human body to perform imaging in various modes. This is accomplished by transmitting ultrasonic waves and receiving ultrasonic information scattered or reflected by tissues in the human body. The imaging information is typically displayed on a monitor in real time.

Conventional ultrasonic imaging devices use scan conversion systems to obtain the image data finally displayed on the monitor. Specifically, the data received by a probe are generally not received and synthesized in accordance with the positions of the coordinates (i.e., rectangular coordinates) of the pixels displayed on the monitor. The received data are usually represented in the form of polar coordinates, and the raster data displayed on the monitor are usually represented in the form of Cartesian coordinates. The rectangular coordinates of the pixels displayed on the monitor need to be converted into the coordinates of acquisition data (i.e. polar coordinates) through coordinate conversion so as to obtain the ultrasonic information for the positions of the rectangular coordinates of the finally-displayed pixels. This is often accomplished by interpolation on the basis of the polar coordinates using a process commonly referred to as scan conversion interpolation. The method for converting the ultrasonic information obtained by the probe into the finally-displayed image is sometimes referred to as the scan conversion method. It may be understood that scan conversion includes two major steps: coordinate conversion and interpolation.

Figure 1:
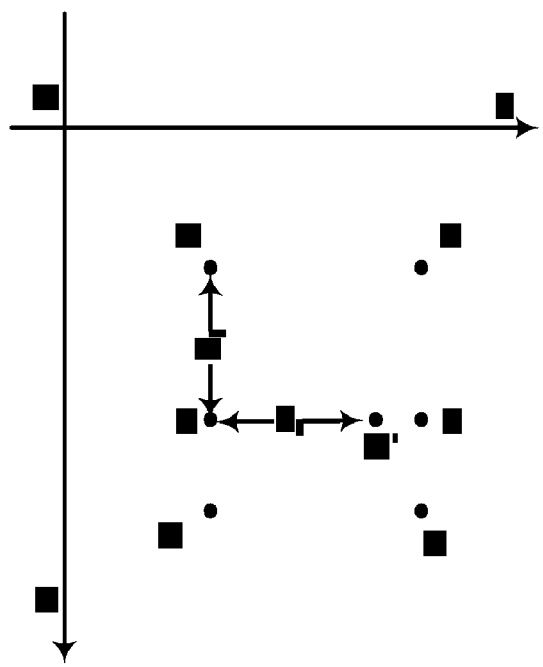
FIG. 1 is a diagram illustrating a conventional method for DSC bilinear interpolation.

In the article "Analysis of a scan conversion algorithm for a real-time sector scanner" (IEEE Transactions On Medical Imaging, Vol. MI-5, No. 2, June 1986), M. H. Lee et al. describe a conventional scan conversion method employing a bilinear interpolation. As shown in FIG. 1, the R direction is the depth direction, and the θ direction is the angle direction. Assuming G (x, y) is a point to be displayed in the rectangular coordinate system, first, the coordinates G'(R, θ) in the polar coordinate system of point G is obtained by coordinate conversion, and then the ultrasonic information of point G' (i.e. point G) is obtained by bilinear interpolation of four points A, B, C, D that are closest to G'(R, θ). Assuming the angle between two adjacent scan lines is normalized as 1 and the distance between two points at adjacent depths is normalized as 1, the coordinates of these four points are respectively A(Ri, θi), B(Ri, θi+1), C(Ri+1, θi), D(Ri+1, θi+1), where Ri is obtained by rounding off R and θi is obtained by rounding off θ. Taking the normalized angle and the normalized distance as weights, first, the value of point E is obtained by means of interpolation between point A and point C in the R direction, then the value of point F is obtained by means of interpolation between point B and point D, and finally the value of point G' is obtained by means of interpolation between point E and point F in the θ direction, wherein the interpolation is linear and the weights of the two points depend on the distances between point G' and the points E and F in the θ direction as follows:

$$E = A \times (1-R_f) + C \times R_f$$

$$F = B \times (1-R_f) + D \times R_f$$

$$G' = E \times (1-\theta_f) + F \times \theta_f$$

wherein, $$R_f = R - R_i$$

$$\theta_f = \theta - \theta_i$$

All the pixel points in the rectangular coordinate system go through the processes of coordinate conversion and interpolation so as to obtain the value of each point for display on the monitor.

The defects of prior approaches lie in the bilinear interpolation method, which uses four points that are closest to the point to be interpolated in depth for interpolation. In practice, however, the interpolated data obtained from interpolation in the principal direction of the point spread function would be more accurate. Generally speaking, the principal direction of the point spread function (PSF) is perpendicular to the depth direction. Therefore, as regards the non-steering imaging of a linear array, a convex array, and a phased array, since the direction of PSF is consistent with that perpendicular to the depth direction (i.e. the direction where the depths are equal), coordinate conversion and interpolation can be deemed as being performed in the principal direction of PSF. However, as regards the steered linear array imaging, the principal direction of PSF is not consistent with the direction where the depths are equal. In this case, if the conventional bilinear interpolation method is used, it is the interpolation in the direction where the depths are equal instead of that in the principal direction of PSF that is employed. As a result, the interpolation result obtained therefrom would not be the most accurate.

In light of the above defects in prior approaches, the present disclosure provides a method and apparatus for scan conversion and interpolation of linear array steering imaging. Since the interpolation used in the disclosed method is performed in the principal direction of the point spread function (PSF), the interpolation result obtained is more accurate than that obtained using conventional methods.

According to one aspect of the present disclosure, a method for scan conversion and interpolation of ultrasonic linear array steering imaging includes performing coordinate conversion on a coordinate point in a display coordinate system by converting the coordinate point in the display coordinate system into a coordinate point to be interpolated in an acquisition data coordinate system. The method also includes computing coordinates of two intersections where a principal direction of a point spread function of the coordinate point to be interpolated intersects two closest scan lines based on a steering angle of the scan lines. In one embodiment, the method further includes determining four interpolation points that are closest to the two intersections on the two closest scan lines based on the coordinates of the two intersections. The method may also include obtaining values of the two intersections by means of interpolation in the direction of the scan lines using the four interpolation points; and obtaining value of the coordinate point to be interpolated by means of interpolation in the principal direction of the point spread function of the coordinate point to be interpolated using the values of the two intersections.

According to another aspect of the present disclosure, an apparatus for scan conversion and interpolation of ultrasonic linear array steering imaging may include a component for performing coordinate conversion on a coordinate point in a display coordinate system by converting the coordinate point in the display coordinate system into a coordinate point to be interpolated in an acquisition data coordinate system. The apparatus may also include a component for computing coordinates of two intersections where a principal direction of a point spread function of the coordinate point to be interpolated intersects two closest scan lines based on a steering angle of the scan lines. In one embodiment, the apparatus includes a component for determining four interpolation points that are closest to the two intersections on the two closest scan lines based on the coordinates of the two intersections. The apparatus may further include a component for obtaining values of the two intersections by means of interpolation in the direction of the scan lines using the four interpolation points. In one embodiment, the apparatus includes a component for obtaining value of the coordinate point to be interpolated by means of interpolation in the principal direction of the point spread function of the coordinate point to be interpolated using the values of the two intersections.

The method and apparatus of present disclosure provide a number of advantages. Since the PSF describes the range of influence of one point in the space, it describes at the same time the positions that are most correlated to that point. Therefore, interpolation in the principal direction of PSF tends to produce a most accurate result. With respect to the linear array steering imaging mode, in comparison with the methods performing interpolation in the direction perpendicular to the depth direction that are used in conventional technologies, the disclosed method performing interpolation in the principal direction of PSF leads to a more accurate interpolation result.

Figure 2:
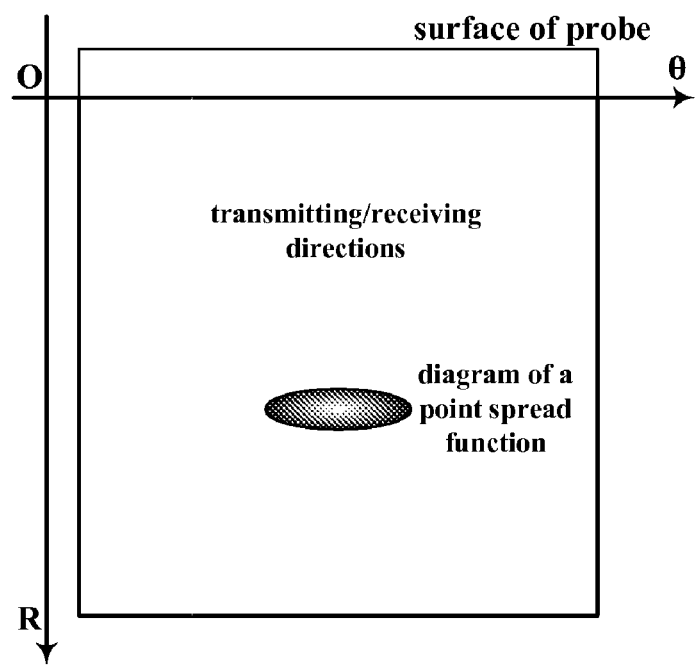
FIG. 2 is a diagram of a point spread function of linear array non-steering imaging.

FIG. 2 shows a diagram of the PSF of linear array non-steering imaging. In FIG. 2, the R direction in the coordinate system is the direction for receiving scan lines (equivalent to the depth direction in the case of non-steering), the θ direction is the direction which is parallel to the surface of the probe, and the transmitting and receiving directions are in the depth direction. Assuming there is a point in the space, the PSF function (two-dimensional) of that point is supposed to be like the white point as shown in FIG. 2. Since generally the resolution ratio in the θ direction is lower than that in the R direction in the usual ultrasonic imaging, the diagram of the PSF is a flat ellipse, and thus, the principal direction of the PSF may be defined as the major axis direction of the ellipse. The PSF describes the shape for the point in the space after ultrasonic imaging, as well as the area that is affected by the point in the space in the ultrasonic image.

Figure 3:
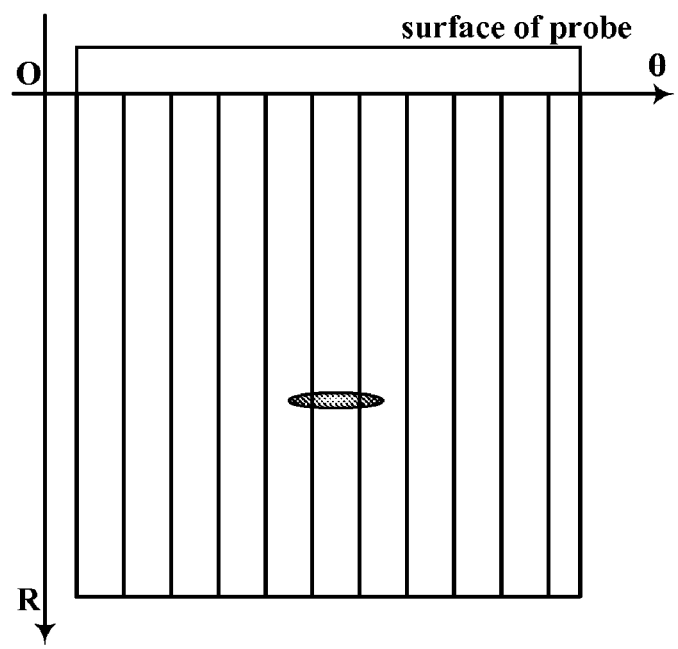
FIG. 3 is a diagram of scan lines and the point spread function of linear array non-steering imaging.

FIG. 3 shows a diagram of the scan lines and PSF of linear array non-steering imaging. In FIG. 3, the white lines are scan lines which are usually consistent with the transmitting direction, while the principal direction of the PSF is perpendicular to the transmitting direction. Accordingly, the principal direction of the PSF is also perpendicular to the direction of the scan lines. In this regard, it can be understood that the PSF determines to what degrees the points on the scan lines are correlated with the point to be interpolated. The stronger the energy at the portion where the PSF intersects the scan line, the more correlated that portion with the value of the point to be interpolated.

Figure 4:
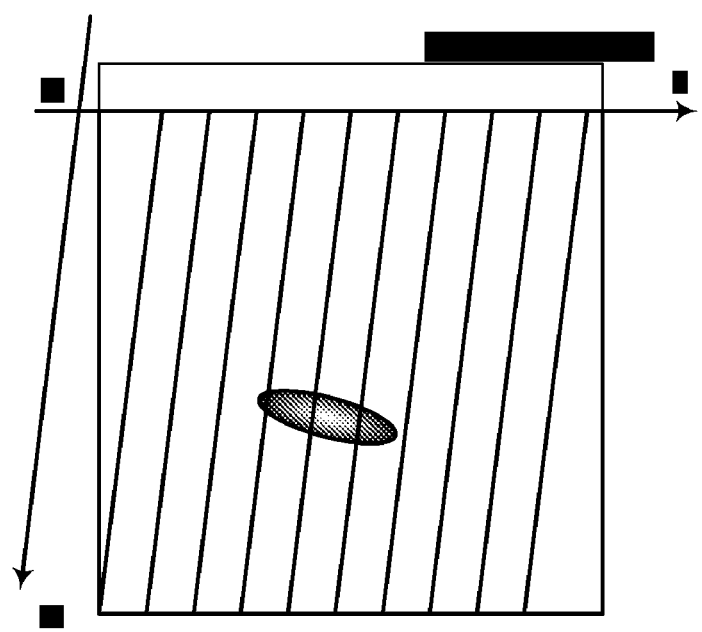
FIG. 4 is a diagram of the scan lines and the point spread function of linear array steering imaging.

With regard to linear array steering imaging, as shown in FIG. 4, the scan lines are steered not perpendicular to the surface of the probe, but at a certain angle with respect to the surface of the probe. As a result, the R direction is also at a certain angle with respect to the depth direction. Since the transmitting direction of the sound field is consistent with the direction of the scan lines, the principal direction of the PSF is still perpendicular to the scan lines; whereas the principal direction of the PSF is no longer perpendicular to the depth direction.

Figure 5:
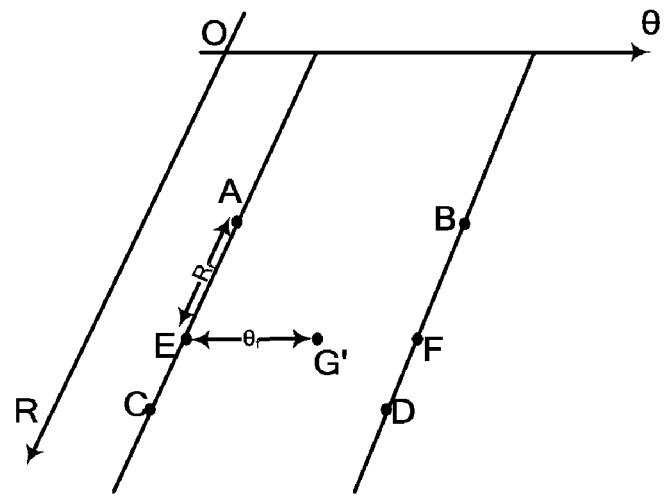
FIG. 5 is a diagram illustrating a conventional interpolation method of linear array steering imaging.

FIG. 5 shows a case in which a conventional method for scan conversion and interpolation is applied in the linear array steering imaging. The point to be displayed in the display coordinate system is G, which is converted into the corresponding point G'(R, θ) in the polar coordinate system through the coordinate conversion. Two points closest to point G'(R, θ) are selected on two respective scan lines that are most adjacent to point G'(R, θ) so as to obtain four points A, B, C, D. Points A and B are of the same depth, points C and D are of the same depth, points A and C are on the same scan line, and points B and D are on the same scan line. The value of point E is obtained by means of linear interpolation between point A and point C, and the value of point F is obtained by means of linear interpolation between point B and point D. Points E, F and point G' being at the same depth, the value of point G' is obtained by means of interpolation between point E and point F as follows:

$$E = A \times (1-R_f) + C \times R_f$$

$$F = B \times (1-R_f) + D \times R_f$$

$$G' = E \times (1-\theta_f) + F \times \theta_f$$

wherein, $$R_f = R - R_i$$

$$\theta_f = \theta - \theta_i$$

It can be seen that the conventional interpolation method obtains the value of a point to be interpolated by means of interpolation between two points along the same depth. However, with regard to the case of linear array steering, the PSF of point G' is perpendicular to the scan lines, hence is not parallel to the θ axis but at a certain steering angle with respect to the θ axis. Therefore, the conventional interpolation method does not perform interpolation between two points most correlated to point G' to obtain the most accurate values.

The method and apparatus of present disclosure, by means of steering, compute two points on the scan line that are most correlated to the point to be interpolated based on the principal direction of the PSF for interpolation so as to obtain the most accurate results.

Figure 6:
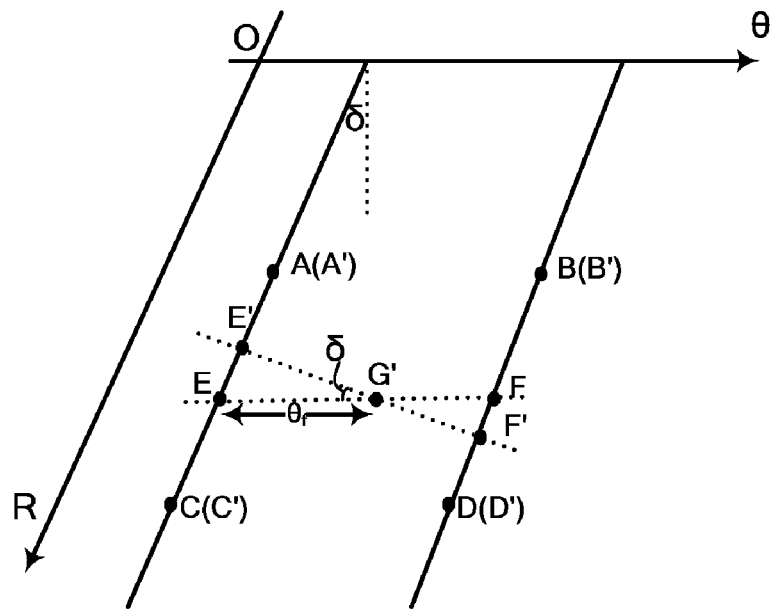
FIG. 6 is a diagram illustrating a method for scan conversion and interpolation of ultrasonic linear array steering imaging according to the present disclosure.

FIG. 6 shows an interpolation method for linear array steering imaging according to the present disclosure. Assuming that the steering angle of the scan line is δ and that point G to be interpolated corresponds to point G' in the polar coordinate system, then a conventional interpolation method is to obtain the value of point G' by means of interpolation between point E and point F of the same depth as G'. Nevertheless, in practice, the PSF of point G' is steered at a certain angle owing to the steered transmission. As shown in FIG. 4, the PSF is steered at a δ angle with respect to the θ axis and perpendicular to the scan lines. Therefore, the value of point G' obtained by means of interpolation between two points most correlated to the principal direction of the PSF is more accurate than the results obtained by conventional interpolation methods. Assuming that points E' and F' are intersections of the straight line passing through point G' and perpendicular to two scan lines most closest to point G' with said two scan lines (as shown in FIG. 6), since points E' and F' are in the principal direction of the PSF of point G', the two points are the points most correlated to point G' on the closest two scan lines. According to the disclosed method, first, the coordinates of points E' and F' are computed; then the values of points E' and F' are obtained respectively by interpolation between the points on the scan lines in the R direction; and finally, the value of G' is obtained by means of interpolation between points E' and F'.

Assuming that the angle between two adjacent scan lines is normalized as 1, the distance between two points at adjacent depths on one scan line is normalized as 1, let the coordinates of the point to be interpolated be G'(R, θ) and the coordinates of points E' and F' be $(E_R', E_\theta')$ and $(F_R', F_\theta')$ respectively, then a formula may be obtained from FIG. 6 for computing the coordinates of points E' and F' as follows:

$$\begin{cases} E_R' = R + \theta_f \times \sin(\delta) \times K \\ E_\theta' = \theta_i \end{cases}$$

$$\begin{cases} F_R' = R + (1 - \theta_f) \times \sin(\delta) \times K \\ F_\theta' = \theta_i + 1 \end{cases}$$

$$K = \text{unit}\_\theta / \text{unit}\_R$$

wherein, unit_θ is the unit sampling physical interval in the θ direction (i.e. the interval between two adjacent scan lines), and unit_R is the unit sampling physical interval in the R direction (i.e. the interval between two points in a scan line).

The R coordinates of points E' and F' are not necessarily at the same depth. With the increase of the steering angle, the difference between the R coordinates of points E' and F' will increase as well. With regard to the conventional interpolation computation, points E and F for interpolation are of the same depth as point G'. Therefore, four points A, B, C, D are used that are closest to point G' in the direction where the depths are equal for interpolation. However, with regard to steering imaging, the information most correlated to point G' is not on these four points closest to the position of point G', but on the four points closest to point G' in the principal direction of PSF. In the present disclosure, two closest points E' and F' computed in the principal direction of PSF are used to find two points A' and C' closest to point E' and two points B' and D' closest to point F' on two respective scan lines; and the value of point G' is obtained by means of interpolation between these four points A', B', C', D', wherein the respective coordinates of these four points A', B', C', D' are:

$$A'(E_{Ri}', E_\theta')$$

$$B'(F_{Ri}', F_\theta')$$

$$C'(E_{Ri}'+1, E_\theta')$$

$$D'(F_{Ri}'+1, F_\theta')$$

Unlike conventional sampling points, A' and B' are not necessarily sampling points of the same depth, and C' and D' are not necessarily sampling points of the same depth. The values of point E' and point F' are obtained by means of interpolation in the direction of the scan lines:

$$E' = A' \times (1-r1) + C' \times r1$$

$$F' = B' \times (1-r2) + D' \times r2$$

$$r1 = E_R' - E_{Ri}'$$

$$r2 = F_R' - F_{Ri}'$$

Finally, the value of point G' to be interpolated is obtained by means of linear interpolation between the values of points E' and F' in the principal direction of PSF:

$$G' = E' \times (1-\theta_f) + F' \times \theta_f$$

The ultrasonic echo data obtained by interpolating all the points to be interpolated may be displayed directly on the monitor.

Figure 7:
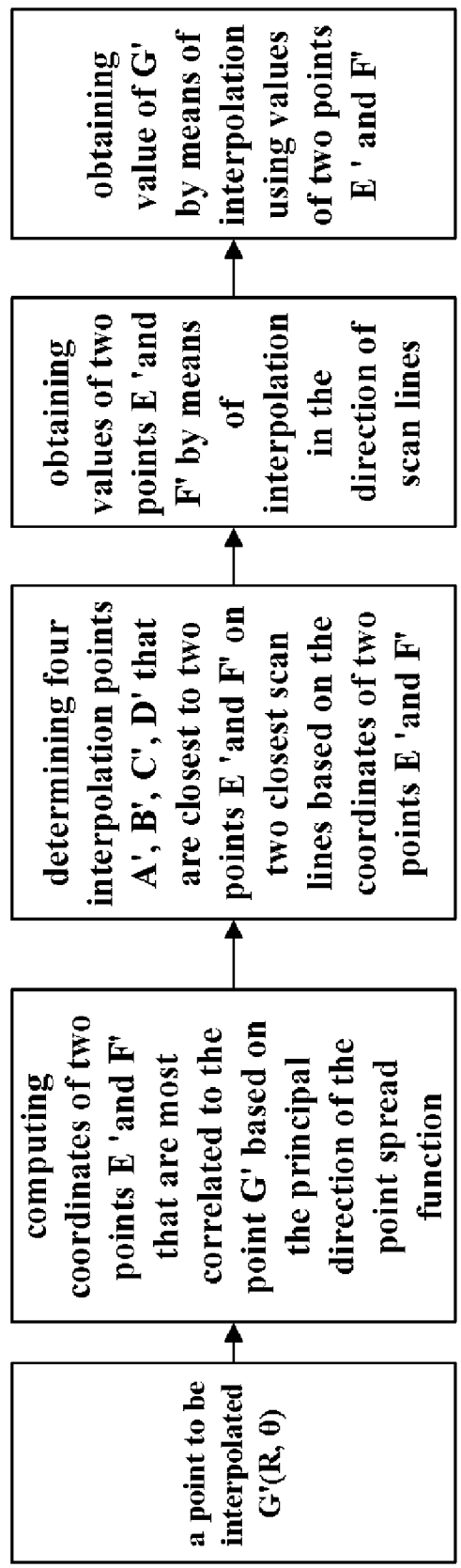
FIG. 7 is a schematic block diagram illustrating an apparatus for scan conversion and interpolation of ultrasonic linear array steering imaging according to the present disclosure.

The structure of an apparatus for scan conversion and interpolation of ultrasonic linear array steering imaging according to the present disclosure is shown in FIG. 7. In one embodiment, the apparatus includes a component for converting coordinates of a point in a display coordinate system into coordinates of a corresponding point to be interpolated in an acquisition data coordinate system. The apparatus may also include a component for computing coordinates of the intersections where the principal direction of the PSF of the point to be interpolated intersects two closest scan lines based on the steering angle of scan lines. In one embodiment, the apparatus includes a component for determining four interpolation points that are closest to the intersections on the two closest scan lines based on the coordinates of the intersections. The apparatus may further include a component for obtaining values of the intersections by means of interpolation in the direction of the scan lines using the four interpolation points. In one configuration, the apparatus may include a component for obtaining value of the point to be interpolated by means of interpolation in the principal direction of the PSF based on the values of the intersections.

A person of ordinary skill in the art will recognize that the described features, operations, or characteristics disclosed herein may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention. The scope of the present invention should, therefore, be determined only by the following claims.

What is claimed is:

1. A method for scan conversion and interpolation of ultrasonic linear array steering imaging, comprising:
performing coordinate conversion via a processor on a coordinate point in a display coordinate system by converting the coordinate point in the display coordinate system into a coordinate point to be interpolated in an acquisition data coordinate system;
computing coordinates via the processor of two intersection where a principal direction for a point spread function of the coordinate point to be interpolated along a perpendicular direction to an imaginary scan line passing through the point to be interpolated at the current steering angle of the linear array intersects two closest scan lines based on a steering angle of the scan lines;
determining via the processor four interpolation points that are closest to the two intersections on the two closest scan lines based on the coordinates of the two intersections;
obtaining via the processor values of the two intersections by means of interpolation in a direction of the scan lines using the four interpolation points; and
obtaining via the processor a value of the coordinate point to be interpolated by means of interpolation in the principal direction of the point spread function of the coordinate point to be interpolated using the values of the two intersections.

2. The method according to claim 1, wherein the coordinates of the two intersections where the principal direction of the point spread function of the coordinate point to be interpolated intersects two closest scan lines are computed according to a formula as follows:

$$\begin{cases} E'_R = R + \theta_f \times \sin(\delta) \times K \\ E'_\theta = \theta_i \end{cases}$$

$$\begin{cases} F'_R = R + (1 - \theta_f) \times \sin(\delta) \times K \\ F'_\theta = \theta_i + 1 \end{cases}$$

$$K = \text{unit}\_\theta / \text{unit}\_R$$

wherein coordinates of the coordinate point to be interpolated is G' (R, θ) and coordinates of the two intersections E' and F' are ($E_R$',$E_\theta$') and ($F_R$',$F_\theta$') respectively, unit_θ is a unit sampling physical interval in a θ direction, unit_R is a unit sampling physical interval in a R direction and δ is a steering angle of the scan line, $\theta_i$ is the ith sampling physical interval of θ and $\theta_f = \theta - f_i$.

3. The method according to claim 1, wherein the values of the two intersections are obtained by means of interpolation in the direction of the scan lines using the four interpolation points according to a formula as follows:

$$E'=A'\times(1-r1)+C'\times r1$$

$$F'=B'\times(1-r2)+D'\times r2$$

$$r1=E_R'-E_{Ri}'$$

$$r2=F_R'-F_{Ri}'$$

wherein coordinates of the four interpolation points are respectively A'($E_{Ri}$',$E_\theta$'), B'($F_{Ri}$',$F_\theta$'), C'($E_{Ri}$'+1,$E_\theta$'), and D'($F_{Ri}$'+1,$F_\theta$') and coordinates of the two intersections are respectively E'($E_R$',$E_\theta$') and F'($F_R$',$F_\theta$').

4. The method according to claim 1, wherein the value of the coordinate point to be interpolated is obtained by means of interpolation in the principal direction of the point spread function of the coordinate points to be interpolated using the values of the two intersections according to a formula as follows:

$$G'=E'\times(1-\theta_f)+F'\times\theta_f$$

wherein G' is the value of the coordinate point to be interpolated.

5. The method according to claim 1, wherein the display coordinate system is a rectangular coordinate system and the acquisition data coordinate system is a polar coordinate system.

6. A non-transitory computer-readable medium comprising program code for causing a computer to perform a method for scan conversion and interpolation of ultrasonic linear array steering imaging, the method comprising:
  performing coordinate conversion on a coordinate point in a display coordinate system by converting the coordinate point in the display coordinate system into a coordinate point to be interpolated in an acquisition data coordinate system;
  computing coordinates of two intersections where a principal direction for a point spread function of the coordinate point to be interpolated along a perpendicular direction to an imaginary scan line passing through the point to be interpolated at the current steering angle of the linear array intersects two closest scan lines based on a steering angle of the scan lines;
  determining four interpolation points that are closest to the two intersections on the two closest scan lines based on the coordinates of the two intersections;
  obtaining values of the two intersections by means of interpolation in a direction of the scan lines using the four interpolation points; and
  obtaining a value of the coordinate point to be interpolated by means of interpolation in the principal direction of the point spread function of the coordinate point to be interpolated using the values of the two intersections.

7. The non-transitory computer-readable medium according to claim 6, wherein the coordinates of the two intersections where the principal direction for the point spread function of the coordinate point to be interpolated intersects two closest scan lines are computed according to a formula as follows:

$$\begin{cases} E'_R = R + \theta_f \times \sin(\delta) \times K \\ E'_\theta = \theta_i \end{cases}$$

$$\begin{cases} F'_R = R + (1 - \theta_f) \times \sin(\delta) \times K \\ F'_\theta = \theta_i + 1 \end{cases}$$

$$K = \text{unit}\_\theta / \text{unit}\_R$$

wherein coordinates of the coordinate point to be interpolated is G' (R, θ) and coordinates of the two intersections E' and F' are ($E_R'$,$E_\theta'$) and ($F_R'$,$F_\theta'$) respectively, unit_θ is a unit sampling physical interval in a θ direction, unit_R is a unit sampling physical interval in a R direction and δ is a steering angle of the scan line, $\theta_i$ is the ith sampling physical interval of θ and $\theta_f = \theta - \theta_i$.

8. The non-transitory computer-readable medium according to claim 6, wherein the values of the two intersections are obtained by means of interpolation in the direction of the scan lines using the four interpolation points according to a formula as follows:

$$E' = A' \times (1-r1) + C' \times r1$$

$$F' = B' \times (1-r2) + D' \times r2$$

$$r1 = E_R' - E_{Ri}'$$

$$r2 = F_R' - F_{Ri}'$$

wherein coordinates of the four interpolation points are respectively A'($E_{Ri}'$,$E_\theta'$), B'($F_{Ri}'$,$F_\theta'$), C'($E_{Ri}'$+1,$E_\theta'$), and D'($F_{Ri}'$+1,$F_\theta'$), and coordinates of the two intersections are respectively E'($E_R'$,$E_\theta'$) and F'($F_R'$,$F_\theta'$).

9. The non-transitory computer-readable medium according to claim 6, wherein the value of the coordinate point to be interpolated is obtained by means of interpolation in the principal direction for the point spread function of the coordinate points to be interpolated using the values of the two intersections according to a formula as follows:

$$G' = E' \times (1-\theta_f) + F' \times \theta_f$$

wherein G' is the value of the coordinate point to be interpolated.

10. The non-transitory computer-readable medium according to claim 6, wherein the display coordinate system is a rectangular coordinate system and the acquisition data coordinate system is a polar coordinate system.

11. A system for scan conversion and interpolation of ultrasonic linear array steering imaging, comprising:
  means for performing coordinate conversion on a coordinate point in a display coordinate system by converting the coordinate point in the display coordinate system into a coordinate point to be interpolated in an acquisition data coordinate system;
  means for computing coordinates of two intersections where a principal direction for a point spread function of the coordinate point to be interpolated along a perpendicular direction to an imaginary scan line passing through the point to be interpolated at the current steering angle of the linear array intersects two closest scan lines based on a steering angle of the scan lines;
  means for determining four interpolation points that are closest to the two intersections on the two closest scan lines based on the coordinates of the two intersections;
  means for obtaining values of the two intersections by means of interpolation in a direction of the scan lines using the four interpolation points; and
  means for obtaining a value of the coordinate point to be interpolated by means of interpolation in the principal direction of the point spread function of the coordinate point to be interpolated using the values of the two intersections.

12. The system according to claim 11, wherein the coordinates of the two intersections where the principal direction of the point spread function of the coordinate point to be interpolated intersects two closest scan lines are computed according to a formula as follows:

$$\begin{cases} E'_R = R + \theta_f \times \sin(\delta) \times K \\ E'_\theta = \theta_i \end{cases}$$

$$\begin{cases} F'_R = R + (1 - \theta_f) \times \sin(\delta) \times K \\ F'_\theta = \theta_i + 1 \end{cases}$$

$$K = \text{unit}\_\theta / \text{unit}\_R$$

wherein coordinates of the coordinate point to be interpolated is G' (R, θ) and coordinates of the two intersections E' and F' are ($E_R'$,$E_\theta'$) and ($F_R'$,$F_\theta'$) respectively, unit_θ is a unit sampling physical interval in a θ direction, unit_R is a unit sampling physical interval in a R direction and δ is a steering angle of the scan line, $\theta_i$ is the ith sampling physical interval of θ and $\theta_f = \theta - \theta_i$.

13. The system according to claim 11, wherein the values of the two intersections are obtained by means of interpolation in the direction of the scan lines using the four interpolation points according to a formula as follows:

$$E'=A'\times(1-r1)+C'\times r1$$

$$F'=B'\times(1-r2)+D'\times r2$$

$$r1=E_R'-E_{Ri}'$$

$$r2=F_R'-F_{Ri}'$$

wherein coordinates of the four interpolation points are respectively $A'(E_{Ri}',E_\theta')$, $B'(F_{Ri}',F_\theta')$, $C'(E_{Ri}'+1,E_\theta')$, and $D'(F_{Ri}'+1,F_\theta')$, and coordinates of the two intersections are respectively $E'(E_R',E_\theta')$ and $F'(F_R',F_\theta')$.

14. The system according to claim 11, wherein the value of the coordinate point to be interpolated is obtained by means of interpolation in the principal direction of the point spread function of the coordinate points to be interpolated using the values of the two intersections according to a formula as follows:

$$G'=E'\times(1-\theta_f)+F'\times\theta_f$$

wherein G' is the value of the coordinate point to be interpolated.

15. The system according to claim 11, wherein the display coordinate system is a rectangular coordinate system and the acquisition data coordinate system is a polar coordinate system.

* * * * *